United States Patent
Nakamura et al.

[11] Patent Number: 5,998,953
[45] Date of Patent: Dec. 7, 1999

[54] CONTROL APPARATUS OF MOBILE THAT APPLIES FLUID ON FLOOR

[75] Inventors: Kyoko Nakamura; Nobukazu Kawagoe, both of Toyonaka; Takao Kobayashi, Takatsuki, all of Japan

[73] Assignee: Minolta Co., Ltd., Osaka, Japan

[21] Appl. No.: 09/137,147

[22] Filed: Aug. 20, 1998

[30] Foreign Application Priority Data

Aug. 22, 1997 [JP] Japan .................................. 9-226295
Aug. 26, 1997 [JP] Japan .................................. 9-229627

[51] Int. Cl.$^6$ .................................................. B64C 13/18
[52] U.S. Cl. .......................... 318/587; 318/580; 701/22; 901/1; 901/43; 15/49.1
[58] Field of Search ................................. 701/22; 901/1, 901/43; 318/580, 587; 134/4; 15/49.1–52.2

[56] References Cited

U.S. PATENT DOCUMENTS

| | | | |
|---|---|---|---|
| 3,817,209 | 6/1974 | Zurick | 118/258 |
| 5,032,775 | 7/1991 | Mizuno et al. | 364/424.029 |
| 5,279,672 | 1/1994 | Betker et al. | 134/18 |
| 5,696,675 | 12/1997 | Nakamura et al. | 701/50 |

FOREIGN PATENT DOCUMENTS

| | | |
|---|---|---|
| 07184411 | 7/1995 | Japan . |
| 09037610 | 2/1997 | Japan . |
| 10039927 | 2/1998 | Japan . |

Primary Examiner—Brian Sircus
Attorney, Agent, or Firm—McDermott, Will & Emery

[57] ABSTRACT

In order to improve the quality of the work of a robot that applies wax, a user enters the ambient environment data (temperature, wax concentration, and the like) of the robot via a controller prior to initiation of the work by the robot. According to the input data, the maximum time (drying time) T before another coat of wax is to be applied without degradation in quality is identified. A travel path is generated according to the time T. The travel is actually carried out according to the calculated path.

14 Claims, 22 Drawing Sheets

| ZIGZAG TRAVEL INITIATED BY <SETTING> VERTICAL DIRECTION 300 cm HORIZONTAL DIRECTION 300 cm |
|---|

NUMBER OF LANES N

FIG. 8

| | 1 | 2 | ... | 15 | 16 | 17 | ... | n-1 | n |
|---|---|---|---|---|---|---|---|---|---|
| WAX CONCENTRATION (%) | 10 | 10 | | 20 | 30 | 30 | | 30 | 30 |
| AMBIENT TEMPERATURE (°C) | 20 | 20 | | 25 | 25 | 20 | | 30 | 30 |
| FLOOR TEMPERATURE (°C) | 20 | 20 | | 25 | 25 | 20 | | 30 | 30 |
| HUMIDITY (%) | 60 | 60 | | 70 | 70 | 80 | | 60 | 60 |
| AIR CURRENT | NO | YES | | NO | NO | NO | | NO | YES |
| DRYING TIME T (MINUTES) | 30 | 15 | | 8 | 5.3 | 6 | | 4.2 | 3 |

CONTROL APPARATUS OF MOBILE THAT APPLIES FLUID ON FLOOR

This application is based on application Nos. 9-226295 and 9-229627 filed in Japan, the contents of which are hereby incorporated by reference.

BACKGROUND OF THE INVENTION

1. Field of the Invention

The present invention relates to a control apparatus of a mobile. More particularly, the present invention relates to a control apparatus of a mobile for the mobile to run in a zigzag manner to work all over a specified region.

2. Description of the Related Art

A robot (one type of mobile) to work within a specified region in every nook and corner is conventionally known. A zigzag travel is generally employed in the control system of such a robot. The zigzag travel is to run back and forth within a specified region at a predetermined interval. This zigzag travel is realized by the combination of a forward operation on a plane and a U-turn operation in reciprocation. The work conducted by the robot includes cleaning, waxing, applying chemical agents, and the like.

FIG. 22 is a diagram for describing an example of the path of the zigzag travel.

A robot 1 starts from a location point "a" to advance ahead by a distance of $L_0$ in the vertical direction of a work area A. Then, robot 1 turns 90° leftwards and advances at a pitch of p, followed by a 90° turn leftwards. Then, robot 1 moves straight forward $L_0$ to arrive at location point "b". By repeating the travel of a 90° turn, advance at pitch p, 90° turn and advance of $L_0$, work area A can be subjected to a working operation leaving no uncovered space.

In such a working operation, there may be an error in the running distance or angle of rotation of robot 1, or difference in the running distance depending upon the state of the floor on which robot 1 runs. In order to eliminate the possibility of an unworked region in the work area, pitch p is determined so that the region worked by robot 1 overlaps in the reciprocating operation.

More specifically, referring to FIG. 23, when the width of the work carried out by one run of robot 1 corresponds to a work width Y, pitch p is set smaller than Y. As a result, a work margin (overlapping width W of work) is produced.

Consider the case where robot 1 is to carry out the work of applying wax. If another coat of wax is applied again on an area where the previously applied wax has dried up, the layer of wax of that overlapping area will become thicker. A step-graded portion will be generated with respect to other areas. In the example of FIG. 23, the work overlapping area (W in FIG. 23) will result in a striation pattern to degrade the quality of the work.

It is therefore necessary to apply the second coat of wax before the underlying wax does not dry up. Furthermore, if reapplication is effected when the underlying wax is half-dried, the glossiness will be lost.

The longest interval in the reapplication of wax is between location points a and b in FIG. 22. Let $t_{LO}$ be the time required for robot 1 to run straight forward the distance of $L_0$, tr the time required for robot 1 to rotate 90°, and tp the time required for robot 1 to travel the pitch of p. The time required for robot 1 to arrive at location point b from location point a is represented by the following equation (0).

$$2 \times t_{LO} + tp + 2 \times tr \ldots (0)$$

SUMMARY OF THE INVENTION

In view of the foregoing, an object of the present invention is to improve the quality of work by a mobile.

To achieve the above object, the present invention according to an aspect is a mobile control apparatus that controls a mobile carrying out a work on a first region, and then on a second region having an area common to the first region.

The mobile control apparatus includes a first set unit for setting the time between the mobile carrying out the work on the common area of the first and second regions and the next work on that common area, and a second set unit for setting a travel path of the mobile according to the time set by the first set unit.

According to another aspect of the present invention, a mobile work apparatus carries out a work on a first region, and then a work on a second region having an area common to the first region.

The mobile work apparatus includes a body for carrying out a predetermined work while moving, a first set unit for setting a time between the body carrying out the work on the common area of the first and second regions and the next work on that area, and a second set unit for setting a travel path of the mobile work apparatus according to the time set by the first set unit.

The foregoing and other objects, features, aspects and advantages of the present invention will become more apparent from the following detailed description of the present invention when taken in conjunction with the accompanying drawings.

BRIEF DESCRIPTION OF THE DRAWINGS

FIG. 8 shows a table to calculate the time T of FIG. 7.

DESCRIPTION OF THE PREFERRED EMBODIMENTS

Figures 1, 3:
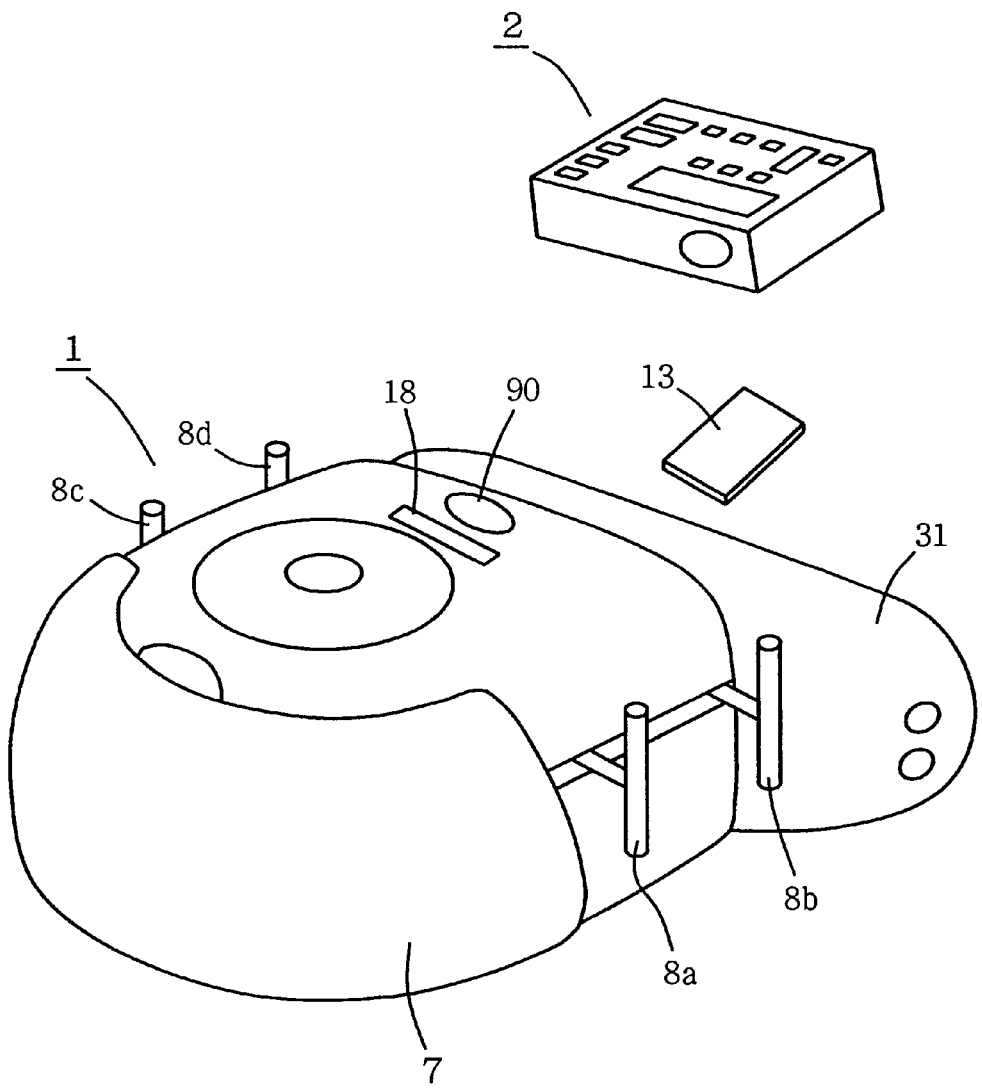
FIG. 1 is a perspective view of a robot and a controller according to a first embodiment of the present invention.
FIG. 3 shows a screen provided on a display unit 18 of controller 2.

Preferable embodiments of the present invention will be described hereinafter with reference to the drawings. In the drawings, likewise reference characters indicate the same or corresponding elements.

First Embodiment

FIG. 1 is a perspective view showing the appearance of mobile robot 1 and a controller 2 thereof according to a first embodiment of the present invention.

Referring to FIG. 1, robot 1 includes a contact sensor 7 for sensing contact of a wall and the like, tracer sensors 8a–8d for measuring the distance from a wall and the like to realize travel relative to the wall, a work unit 31 for carrying out the work of applying wax on the floor by rotating a nonwoven fabric, a display unit 18 for providing a message to a user, and a work start button 90 for initiating a work operation. Also, by inserting a memory card 13 into robot 1, a stored command can be executed by robot 1.

Robot 1 is formed of a mobile unit with driving wheels, and a chassis unit. The mobile unit and the chassis unit are implemented rotatable with each other. Work unit 31 is attached to the chassis unit.

Figure 2:
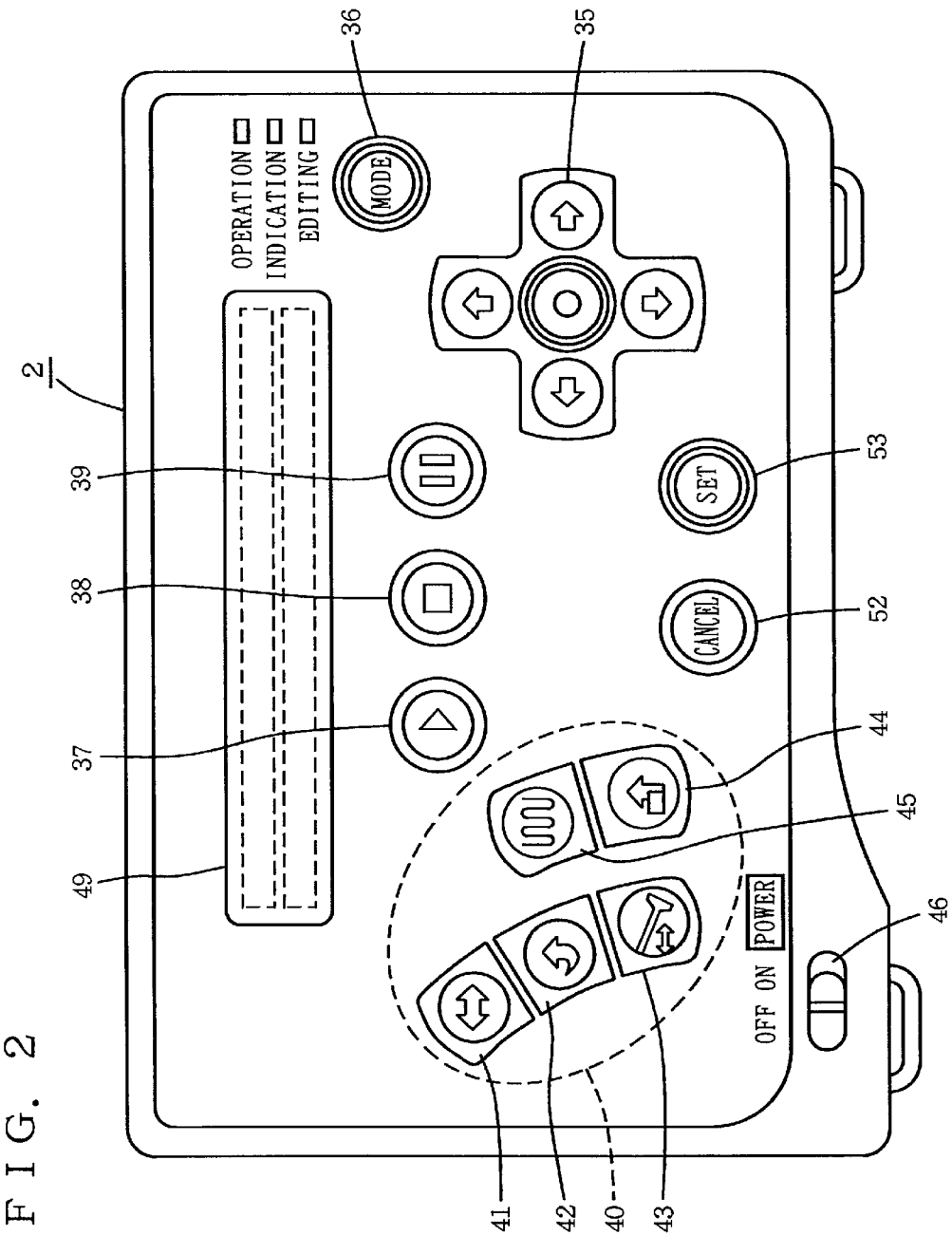
FIG. 2 is a plan view of a controller 2 of FIG. 1.

FIG. 2 is a plan view of controller 2.

Controller 2 is used to remote-control robot 1 and to instruct running and working operations. The input unit of controller 2 includes an operation shift button group 40, a cross cursor button 35 for specifying the direction, a mode switch button 36 to switch the mode, a start button 37 to designate initiation of an operation of robot 1, a stop button 38 to designate cessation of an operation, a temporary stop button 38 to temporarily stop an operation, a cancel button 52 to cancel a setting, a set button 53 to set input data, and a power switch 46.

Operation shift button group 40 includes a mobile unit rotation button 41 to rotate leftwards or rightwards the direction of the mobile unit without altering the direction of the chassis unit, a chassis unit rotation button 42 to rotate both the chassis unit and the mobile unit at the same time, a work unit slide button 43 to move work unit 31 leftwards and rightwards with respect to the chassis unit, a U-turn button 44 for specifying a U-turn operation, and a zigzag button 45 to specify zigzag travel.

By using these buttons in combination, remote control operation, designation of a work, editing and setting of robot 1 can be effected.

Controller 2 includes a display unit 42 formed of a liquid crystal display.

The set menu of zigzag travel as shown in FIG. 3 and the like are provided on display unit 42. The user operates cross cursor button 35 and set button 53 while viewing display unit 49 to input data to controller 2.

Figure 4:
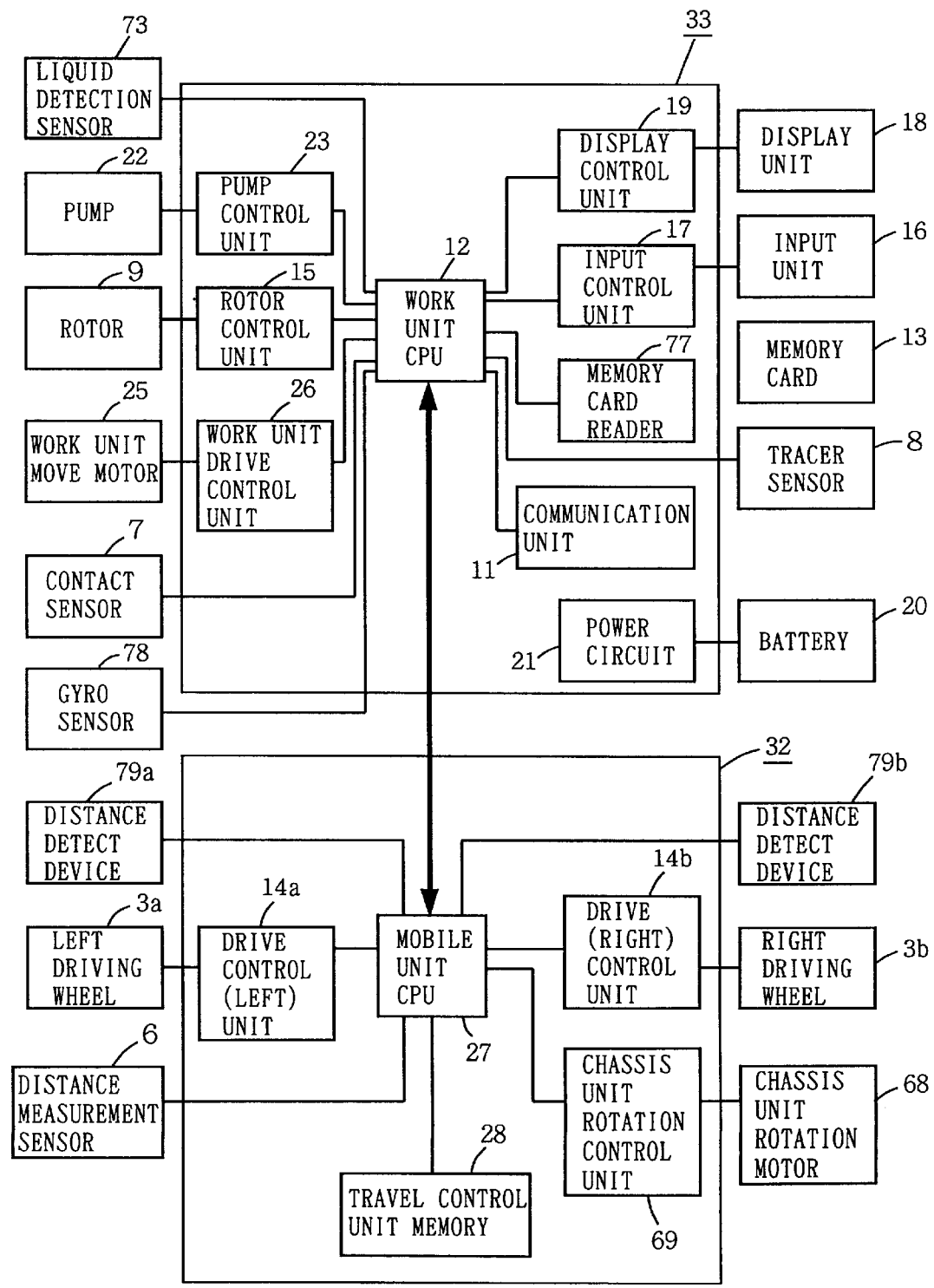
FIG. 4 is a block diagram showing a circuit structure of robot 1.

FIG. 4 is a block diagram showing a structure of robot 1 of FIG. 1. Referring to FIG. 4, robot 1 is mainly formed of a travel control unit 32 for controlling the travel of robot 1, and a work control unit 33 for controlling the wax applying work.

Travel control unit 32 includes a mobile unit CPU 27 providing control of the process of the mobile unit, drive control units 14a and 14b for providing the drive control of each left and right driving wheels 3a and 3b, a chassis unit rotation control unit 69 for rotating a motor 68 to rotate the chassis unit and the mobile unit in a relative manner, and a travel control unit memory 28 for storing the travel control procedure and the like.

Distance detect devices 79a and 79b for detecting the running distance of robot 1 from the amount of rotation of the left and right driving wheels, a distance measurement sensor 6 for recognizing the environment around robot 1, and a chassis unit rotation motor 68 for providing relative rotation of the mobile unit and the chassis unit are connected to travel control unit 32.

Work control unit 33 includes a work unit CPU 12 providing control of the process of work unit 31, a display control unit 19 for providing control of display of display unit 18, an input control unit 17 for providing the input control at input unit 16, a memory card reader 77 for reading memory card 13, a communication unit 18 for communicating with controller 2, a pump control unit 23 for controlling a pump 22 to apply the wax in droplets, a rotor control unit 15 for providing control of a rotor 9 that spreads and rubs the applied wax on the floor, a work unit drive control unit 26 for driving a motor 25 to move work unit 31, and a power circuit 21.

A liquid detection sensor 73 for detecting droplets of wax, a contact sensor 7, a gyro sensor 78, a tracer sensor 8, and a battery 20 are connected to work control unit 33.

Work unit CPU 12 and mobile unit CPU 27 are connected to each other.

Figure 5:
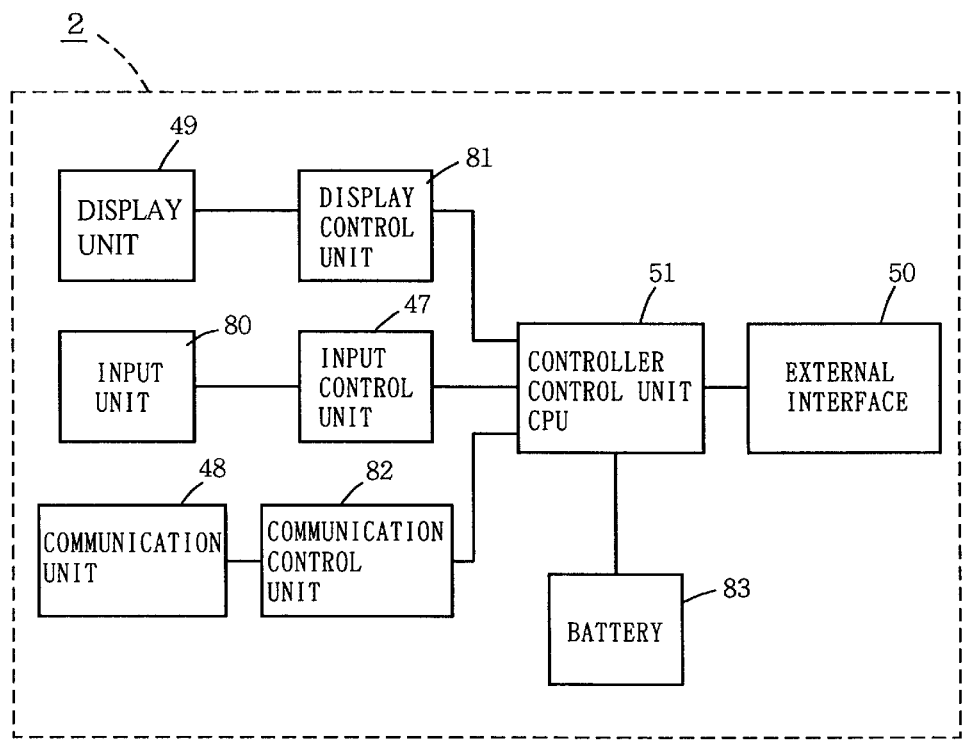
FIG. 5 is a block diagram showing a circuit structure of controller 2.

FIG. 5 is a block diagram showing a structure of controller 2.

Referring to FIG. 5, controller 2 includes a controller control unit CPU 51 for providing control of controller 2, a display control unit 81 for providing control of display unit 49, an input control unit 47 for providing control of input unit 80 formed of the aforementioned buttons, a communication unit 48 for communicating with robot 1, a communication control unit 82 for providing control of communication unit 48, a battery 83, and an external interface 50.

Controller 2 is connectable directly or indirectly with an external apparatus such as a personal computer or a printer via external interface 50.

Figure 6:
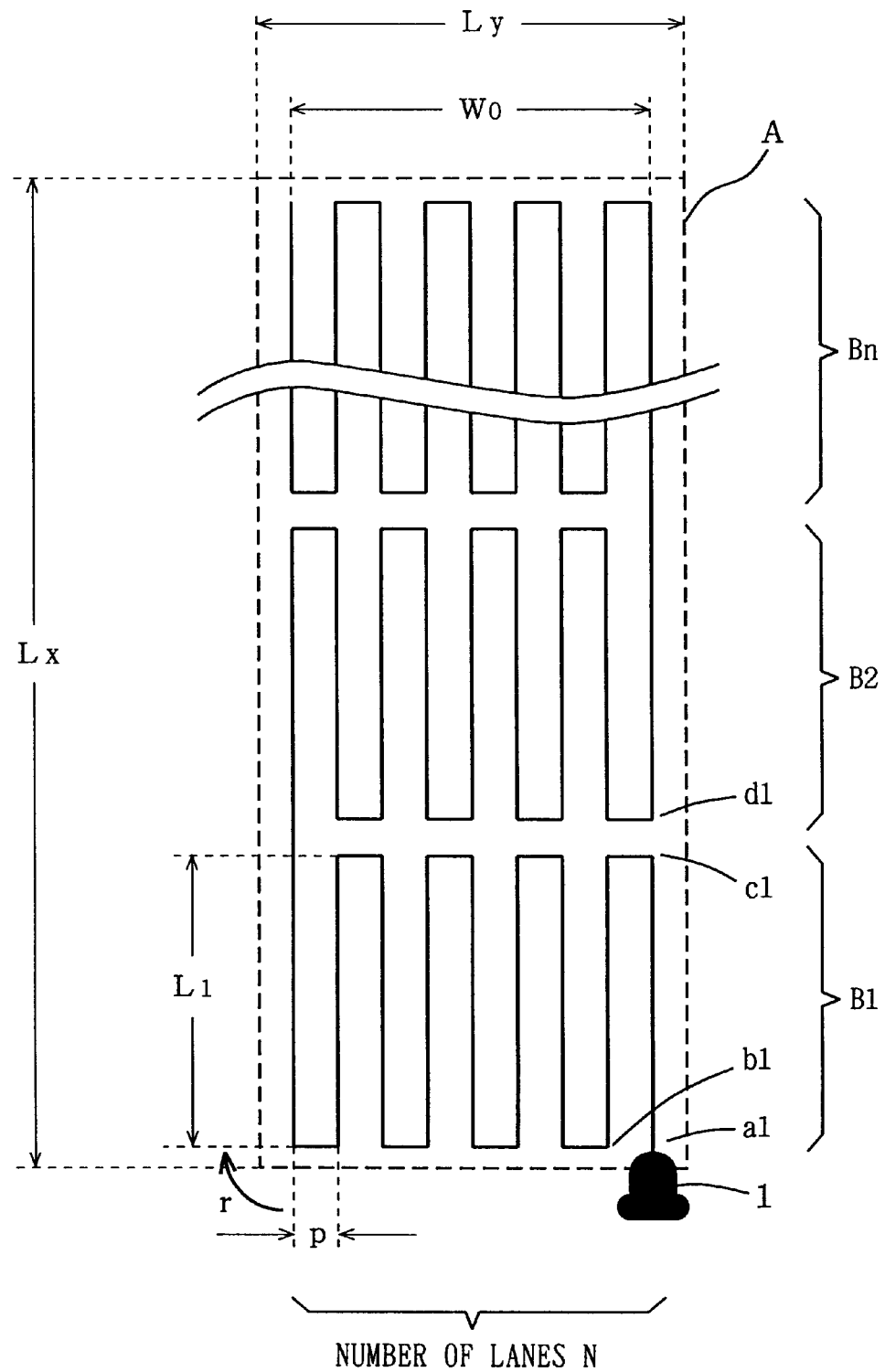
FIG. 6 is a plan view of a travel path determined by robot 1.

FIG. 6 is a plan view showing an example of a work path of robot 1 of the present embodiment.

It is assumed that the region A (work region) on which wax is to be applied by robot 1 has a horizontal length of Ly and a vertical length Lx. The travel path of robot 1 is automatically determined as a result of the user entering the horizontal length and vertical length of the work region to robot 1. The path is determined so that the zigzag travel carried out by robot 1 is divided into a plurality of blocks.

In the example of FIG. 6, the travel path is divided into n blocks of B1–Bn in the vertical direction. Zigzag travel is carried out in each block. Here, the pitch in the horizontal direction is p and the length in the vertical direction is L1 for the zigzag travel.

The adjacent areas between blocks B1 and B2, and between blocks B2 and B3 are the area where wax is overlapped. This area is the common region between a preceding work and a succeeding work.

Figure 22:
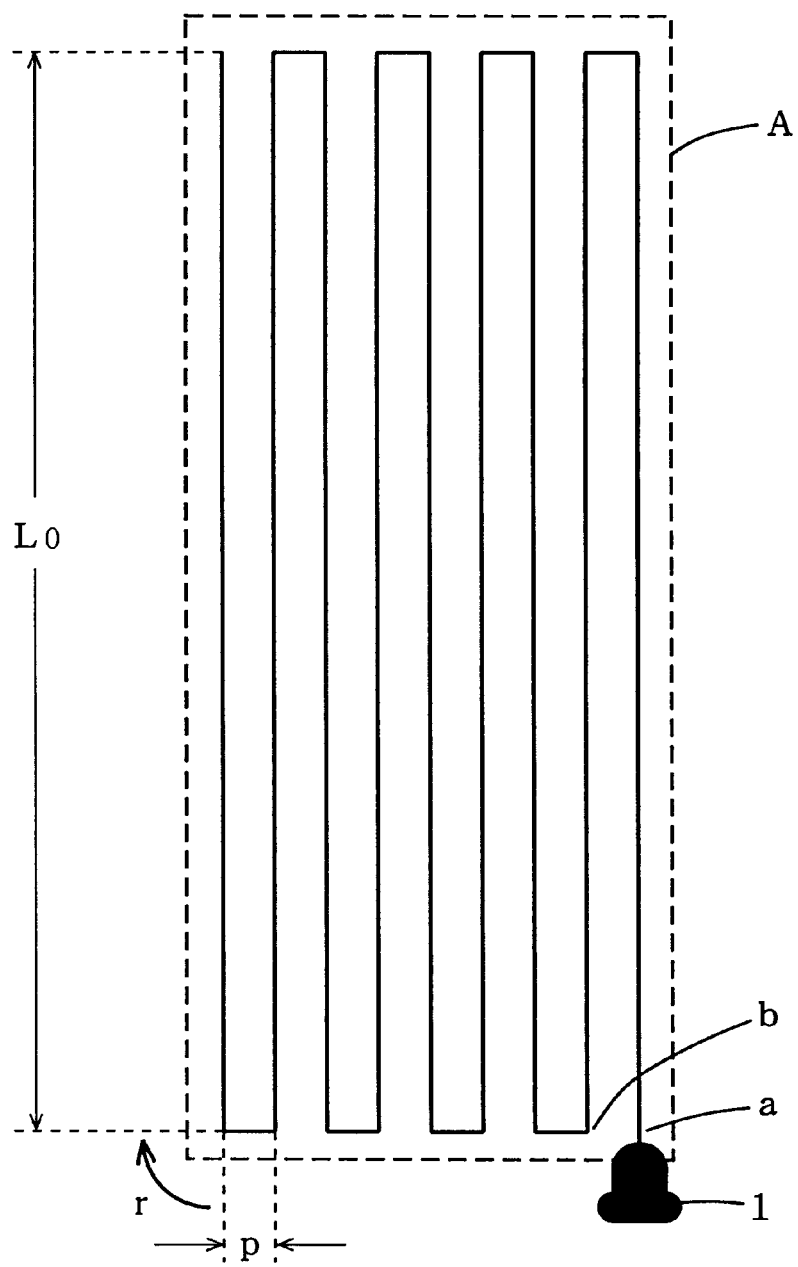
FIG. 22 is a plan view for describing an example of zigzag travel.
Figure 23:
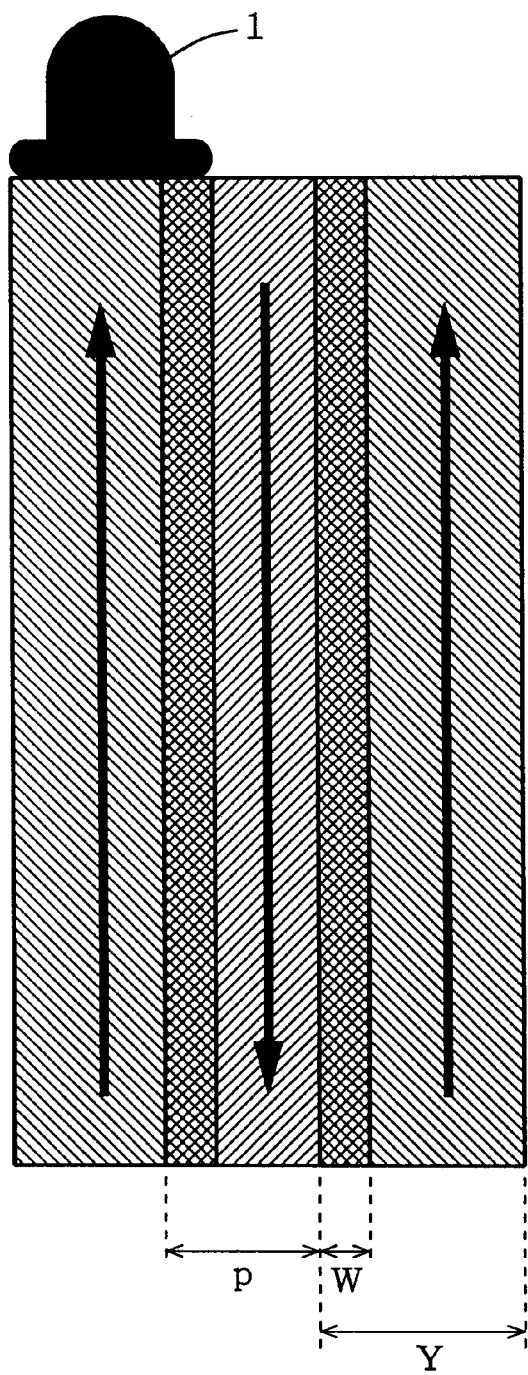
FIG. 23 is a diagram for describing the relationship between pitch p and work overlapping width W of zigzag travel.

The reason why zigzag travel is carried out in each of the divided plurality of blocks is to reduce the time between the application of the first coat of wax and the next overlapping coat of wax. More specifically, in the path of FIG. 22, the longest period of time from the application of the first coat of wax to the next overlapping coat of wax is encountered during the travel from location point a to b. In the present embodiment, the travel from location point c1 to location point d1 of FIG. 6 corresponds to the travel from location point a to location point b in FIG. 22 since the zigzag travel is divided into the plurality of blocks B1–B3. Assuming that the period of time of applied wax to become half-dried is T, the travel path is determined so that the time required for robot 1 to start from location point c1 to arrive at location point d1 is less than T. In order to work on a region of length Lx exactly up to the end with limitation in vertical length L1, a plurality of vertical lengths L1 are to be combined to correspond to vertical length Lx. In other words, the overall travel is divided into a plurality of blocks where zigzag travel is carried out to complete the work.

As to the common region of blocks B1 and B2, the time point when that region is first worked by robot 1 corresponds to the time point when the first coat of wax is applied at location point c1 in block B1. That region is subjected to the work by robot 1 again when wax is applied at location point d1 in block B2.

In the present embodiment, the period of time from the application of wax at location point c1 to the overlapping application of wax at location point d1 in FIG. 6 is longest. The travel path is determined so that this period of time is less than the period of time for the wax to become half-dried.

Figure 7:
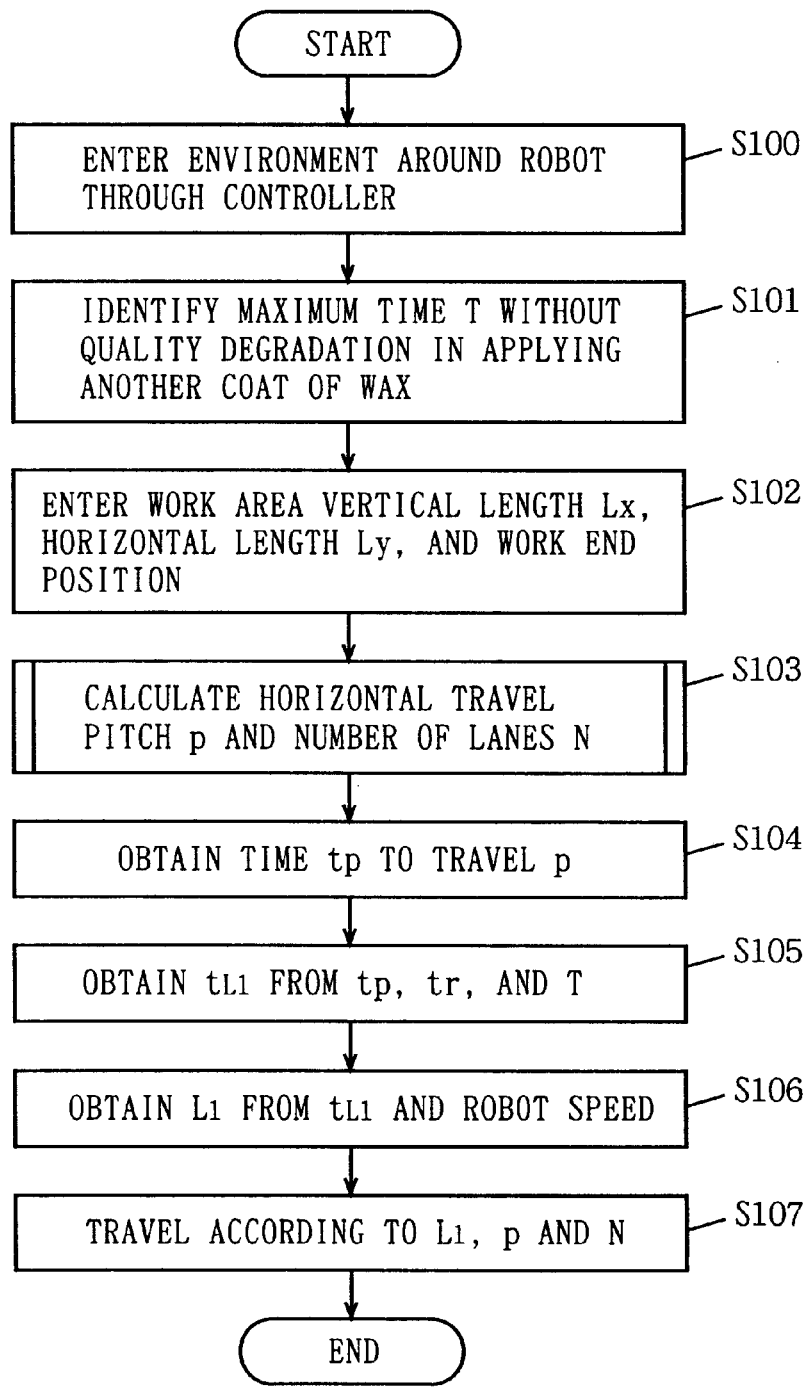
FIG. 7 is a flow chart showing a travel process of robot 1.

FIG. 7 is a flow chart showing the process of the wax applying work of robot 1.

At step S100 of FIG. 7, information associated with the environment that affects the work of robot 1 is input through the operation of controller 2 by the user. More specifically, an environment condition set menu appears on display unit 49 of controller 2. The user operates cross cursor button 35 and set button 53 to input the environment information, which is the concentration [%] of the wax (liquid used in the work), the ambient temperature [° C.], the temperature of the floor to be worked [° C.], the humidity [%], and whether there is a current of air in the proximity of the floor. The concentration of wax can be input directly by the user through numerics. Alternatively, a concentration conversion table for each product of wax can be prestored in the apparatus, so that the concentration of the wax can be input through selection of a product name by the user. The information input through controller 2 is sent to robot 1.

At step S101, the maximum time T (minutes) without degradation in the work when wax is to be overlapped is identified according to the received information associated with the environment. This identification is carried out through a table shown in FIG. 8. More specifically, in the table shown in FIG. 8, the drying time of wax corresponding to the environments of 1–n is recorded. The wax concentration [%], temperature [° C.], the floor temperature [° C.], humidity [%], and presence of air current are recorded as factors that affect the dry up of wax. The time T required for the wax to dry (the maximum time before the quality is degraded in applying another coat of wax) is identified according to the input information.

At step S102, the display of FIG. 3 is provided on display unit 49. Here, the user inputs the vertical length LX and horizontal length LY of work area A, and the location of terminating the work. At step S103, the horizontal travel pitch p and the number of lanes L are calculated according to the horizontal length Ly of the work area. At step S104, the time tp required for robot 1 to travel pitch p according to the advancing speed is obtained.

At step S105, the time $t_{L1}$ required to travel length L1 in the vertical direction of the zigzag travel is obtained by the following equation (1) on the basis of the time tp for traveling pitch p, the time tr required for robot 1 to turn 90°, and the time T identified at step S101.

$$2 \times n \times t_{L1} + 2 \times n \times tp + 4 \times n \times tr = T \tag{1}$$

where n=(number of lanes N)−1.

The length L1 in the vertical direction of the zigzag travel is obtained from the value of $t_{L1}$ and the speed of robot 1 at step S106.

At step S107, the travel of robot 1 shown in FIG. 6 is effected according to variables L1, p, and N.

Figure 9:
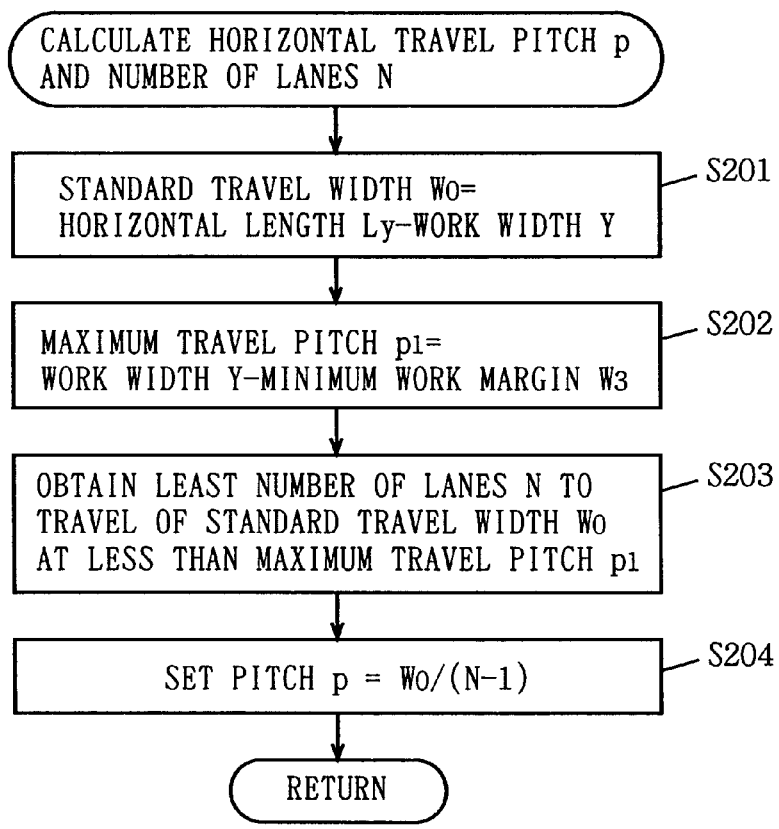
FIG. 9 is a flow chart of a calculation routine (S103) of a horizontal travel pitch p and the number of lanes N of FIG. 7.

FIG. 9 is a flow chart of the calculation process for the horizontal travel pitch p and the number of lanes N of step S103 of FIG. 7.

Figure 10:
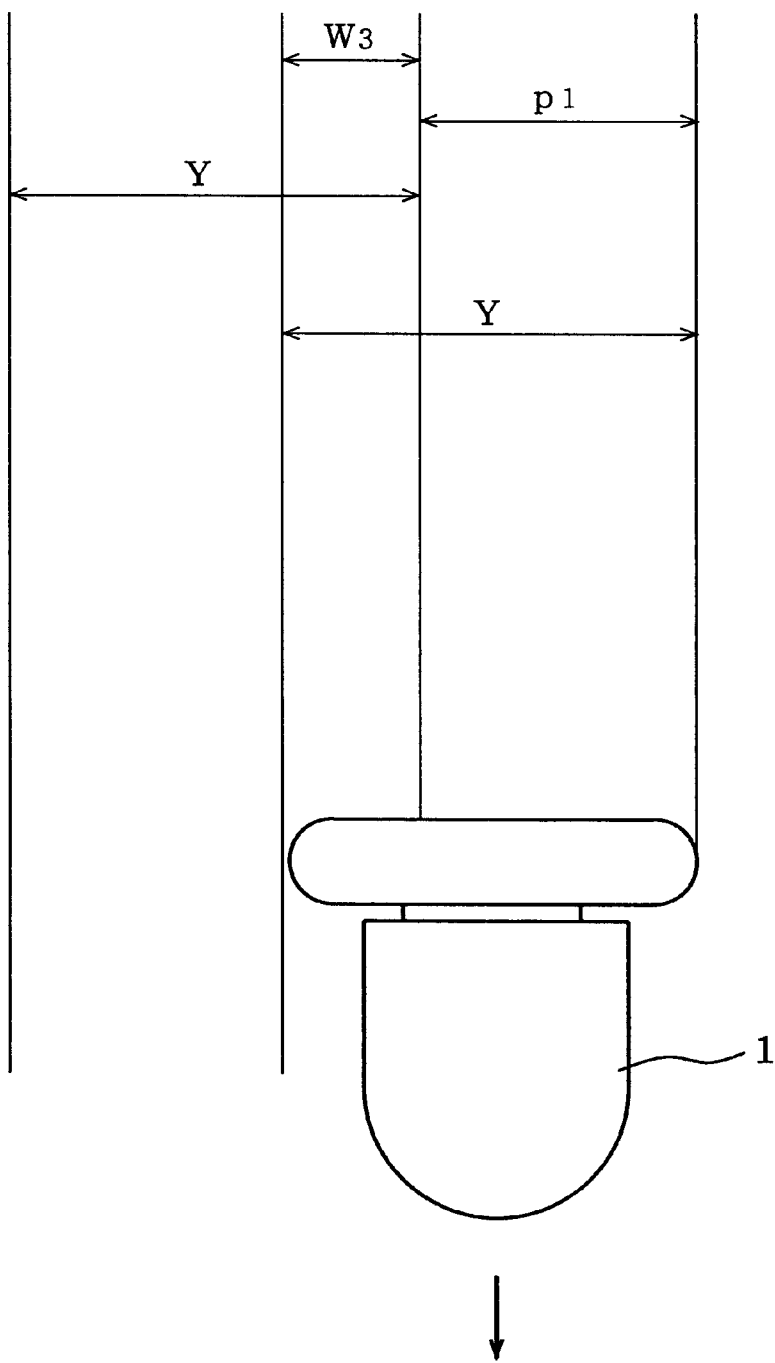
FIG. 10 is a plan view for describing a work width and a work overlapping region of robot 1.

At step S201 of FIG. 9, the value of the input work area horizontal length Ly minus the work width Y of robot 1 is taken as standard travel width W0. Here, work width Y indicates the width Y of the work carried out by robot 1 in one straight forward advance, as shown in FIG. 10. Therefore, referring to FIG. 6, the standard travel width W0 obtained by subtracting work width Y from work area horizontal length Ly indicates the width between the lane in which robot 1 runs right after the start of the work operation and the lane in which robot 1 runs at the end of the work operation.

At step S202 of FIG. 9, work width Y minus minimum work margin W3 is calculated as the maximum travel pitch P1. Here, minimum work margin W3 indicates the smallest value of the work width that is overlapped in a reciprocating motion when robot 1 runs zigzag, as shown in FIG. 10. This minimum value is determined according to the error associated with the travel of robot 1. The maximum travel pitch P1 is the pitch p in the horizontal direction of the zigzag travel, indicating the available maximum value.

At step S203, the minimum number of lanes N that can be run out of standard travel width W0 at a pitch shorter than the maximum travel pitch P1 is obtained. At step S204, the value of W0/(N−1) is inserted into the value of pitch p of the zigzag travel.

By the above control, the problem of the wax becoming half-dried or completely dried during the travel of robot 1 from location point c1 to location point d1 of FIG. 6 can be eliminated. Thus, the problem of unevenness in the waxed face or glossiness of the floor after waxing being lost can be prevented.

Although the drying time of wax depends upon the environment in which robot 1 works such as the concentration of wax, temperature, floor temperature, humidity, and whether there is air current or not, control of robot 1 corresponding to change in the environment can be provided according to the table of FIG. 8.

Second Embodiment

Figure 11:
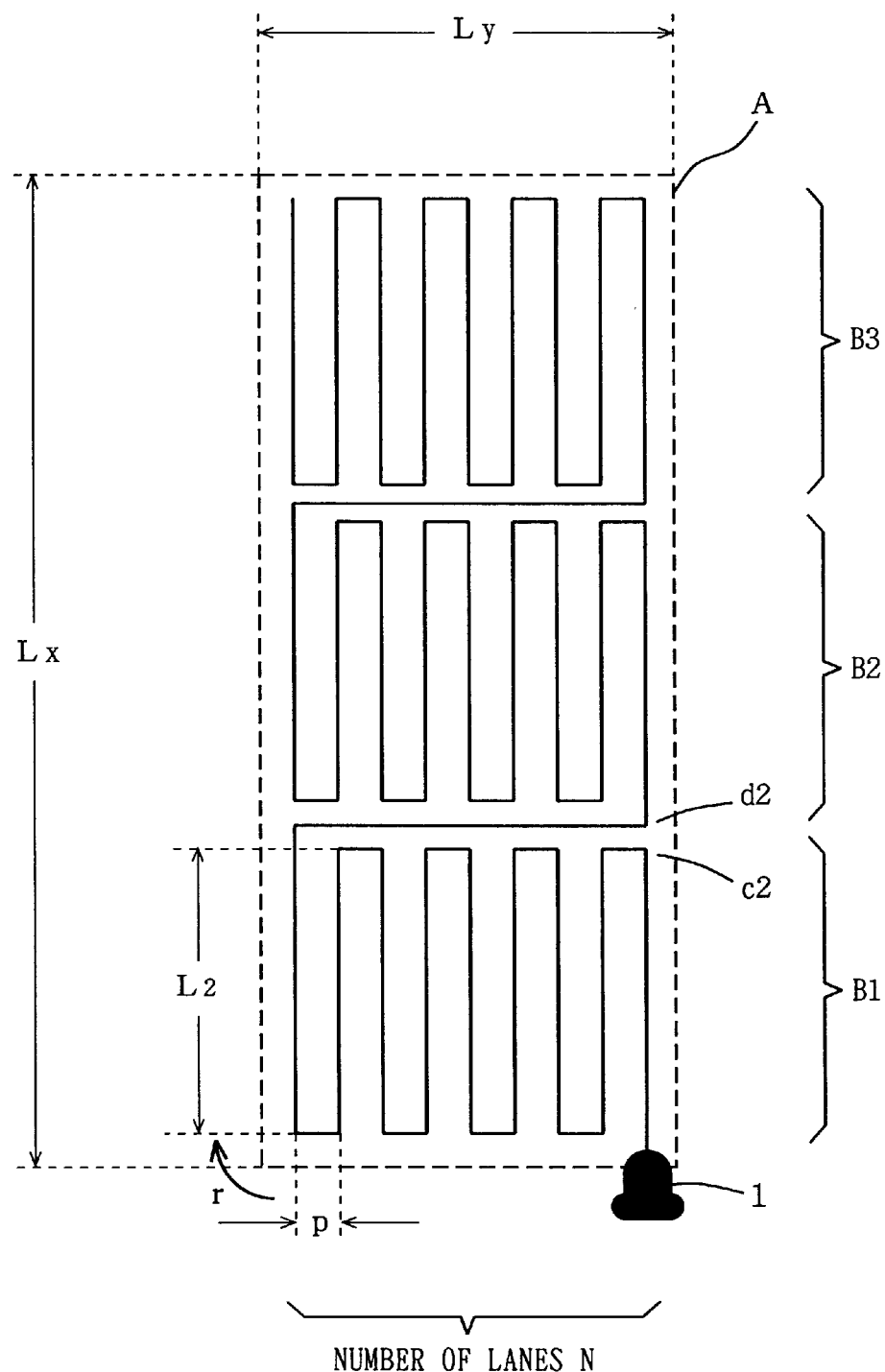
FIG. 11 is a plan view of a travel path of robot 1 according to a second embodiment of the present invention.

FIG. 11 is a plan view showing a travel path of robot 1 according to a second embodiment of the present invention. The hardware structure of robot 1 is identical to that of the first embodiment. Therefore, description thereof will not be repeated.

In the second embodiment, robot 1 moves in the horizontal direction after the zigzag travel of one block is completed to return to the side of the starting lane (location point d2). Then, a zigzag travel in the next block is carried out. Accordingly, the time required to travel from location point c2 to location point d2 (the time corresponding to location point c1 to location point d1 in FIG. 6) can be reduced. As a result, the distance L2 in the vertical direction of the zigzag travel can be increased to carry out the entire work more quickly. It is to be noted that a higher quality of the waxing work can be obtained when the wax is applied in a longer straight forward distance. Therefore, the quality of the work carried out by robot 1 can be improved than that of the first embodiment. More specifically, the time $t_{L2}$ for traveling distance L2 is obtained by the following equation (2).

$$n \times t_{L2} + 2 \times n \times tp + 2 \times n \times tr = T \quad (2)$$

where n=(number of lanes N)−1, tp the time for traveling pitch p, and tr the time required for robot 1 to turn 90°.

When the type of wax to be applied is the same as that of the first embodiment and T is equal, the following is obtained by equations (1) and (2).

$$n \times t_{L2} + 2 \times n \times tp + 2 \times n \times tr = 2 \times n \times t_{L1} + 2 \times n \times tp + 4 \times n \times tr$$

This results in the following equation:

$$t_{L2} = 2 \times t_{L1} + 2 \times tr \quad (3)$$

Since the time required for robot 1 to advance straight forward is proportional to the distance, the straight forward distance L2 of the zigzag travel in the second embodiment is at least two times the distance L1 of the first embodiment.

In the present second embodiment, similar to the flow chart of FIG. 7, the environment around robot 1 is input through controller 2. The wax drying time T is obtained according to the table of FIG. 8. The straight forward distance L2 of the zigzag travel is calculated by equation (2) according to the obtained value of T.

The specific operation of robot 1 will be described hereinafter.

Figure 12:
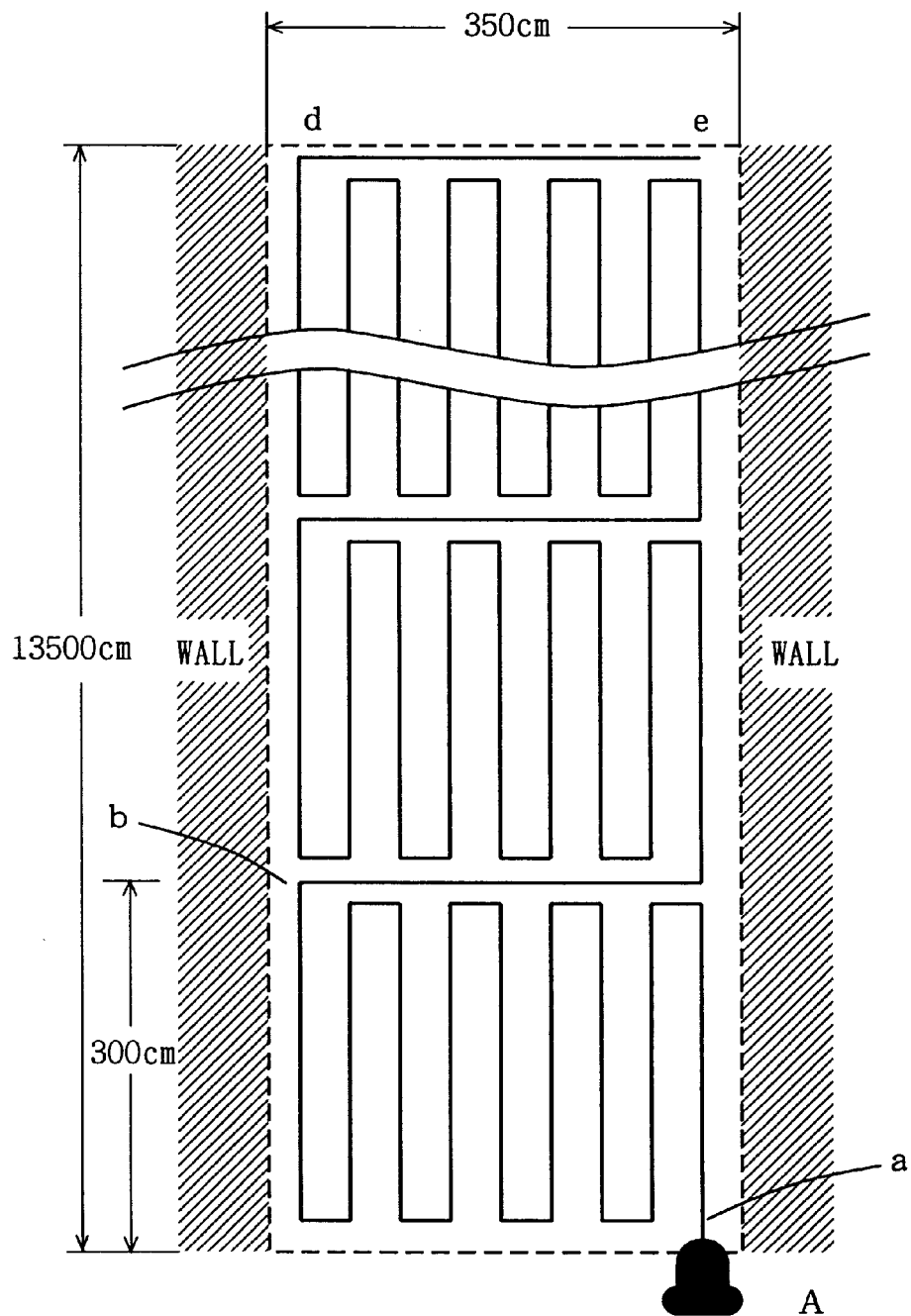
FIG. 12 is a plan view showing a travel path of robot 1 in a first environment.
Figures 13A, 13B, 13C, 13D, 13E:
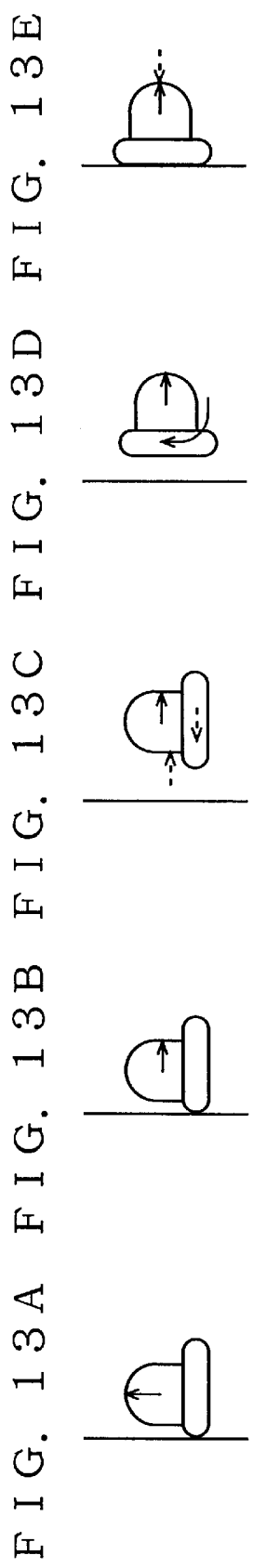
FIGS. 13A–13E are plan views for describing an operation of robot 1 at location point b of FIG. 12.

Referring to FIG. 12, robot 1 is used to carry out a work in a region sandwiched by left and right walls. The user enters information associated with the environment of robot 1 via controller 2. It is assumed that the user has entered the information of liquid concentration of 20%, the ambient temperature of 25° C., the floor temperature of 25° C., humidity of 70%, and no air current near the floor in the environment condition set menu.

It is identified that the wax drying time T is 8 minutes since the environment of number 15 referring to the table of FIG. 8 corresponds to the current environment.

The user also enters the value of vertical length Lx=13500 cm, and the horizontal length Ly=350 cm through controller 2. Furthermore, the work initiating side (location point e) of robot 1 is input as the position of robot 1 to end the working operation.

Robot 1 calculates the zigzag travel pitch p, length L2 in the vertical direction of the zigzag travel, and the number of lanes N according to the above-described wax drying time T and the like to determine the travel path. Then, robot 1 moves according to the travel path.

Here, length L2 in the vertical direction of the zigzag travel is calculated as 300 cm.

The straight forward run from the travel starting location point a is carried out relative to the right side wall using the right tracer sensors 8c and 8d. When robot 1 advances straight ahead by a distance L2 in the vertical direction of the zigzag travel, robot 1 stops temporarily. Then, to proceed the work leftwards, a rotation to the left, advance of pitch p, and leftward rotation are carried out to make a U-turn. At the completion of the U-turn motion, robot 1 moves straight ahead by the distance of L2 again to run along the second lane. In the second lane, robot 1 runs so as to maintain a constant distance with respect to the left and right walls using distance measurement sensor 6. Upon travel of distance L2, robot 1 makes a U-turn rightwards. A zigzag travel is carried out by repeating this reciprocating motion. In the last lane of the zigzag travel arriving at location point b, the left tracer sensors 8a and 8b are used.

At location point b, robot 1 rotates 90° rightwards. Since there is a wall at the left side, this 90° rotation must be carried out after robot 1 is moved away from the wall. For this purpose, the 90° rotation is carried out by the step shown in FIGS. 13A–13E.

Referring to FIGS. 13A–13E, upon arrival at the last location point (point b) of the zigzag travel (A), the direction of driving wheels 3a and 3b are moved to the right direction as indicated by the arrow (B). Then, the driving wheels are rotated, whereby robot 1 moves away from the left wall (C). When the position of work unit 31 is shifted rightwards with respect to the center of robot 1, work unit 31 is moved leftwards, so that the position of work unit 31 is at the center (C). In this state, the chassis unit of robot 1 is rotated 90° clockwise. Then, robot 1 retreats to form contact with the wall to prevent any area leftover that is not worked (E).

Referring to FIG. 12 again, robot 1 moves ahead from location point b until contact with the wall. Upon contact with the wall, robot 1 rotates 90° leftwards, and then advances slightly ahead to move to the starting position of the next block for the zigzag travel. By repeating a similar zigzag travel, the work operation ends at location point e.

In FIG. 12, the end position of the work (location point e) is set at the starting side of the work by robot 1. Appropriate setting by the user can be provided so that the ending position of the work is at the side opposite to that of the starting side of the work by robot 1 (location point d).

Figure 14:
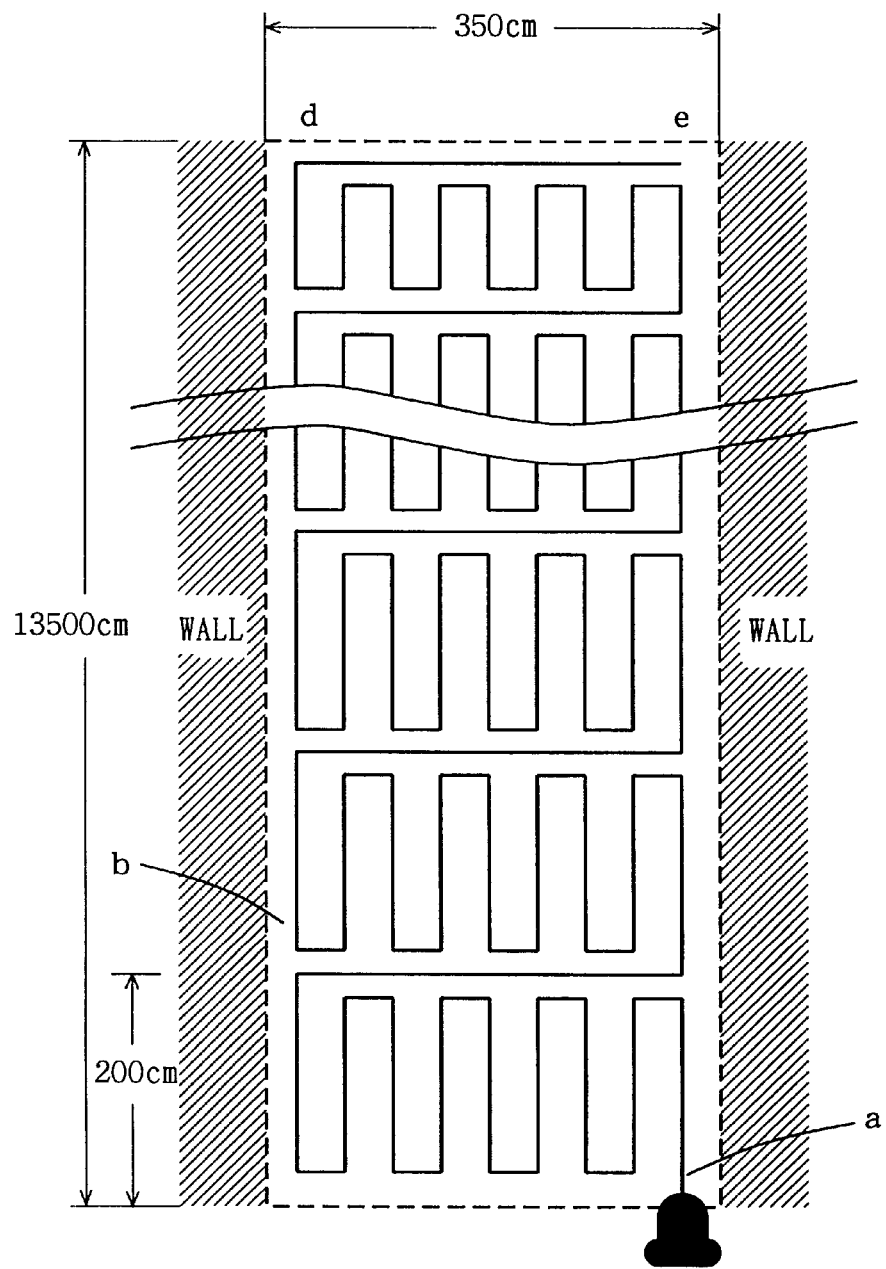
FIG. 14 is a plan view showing a travel path of robot 1 in a second environment.

FIG. 14 shows the travel path when the user enters the information of liquid concentration of 30%, ambient temperature of 25° C., floor temperature of 25° C., humidity of 70% and no air current in the proximity of the floor for the working operation of a region identical to that of FIG. 12.

In this case, 5.3 minutes is identified as the wax drying time T as a result of correspondence to the sixteenth environment in the table of FIG. 8. Therefore, a value shorter than that of the example of FIG. 12, for example the value of 200 cm, is calculated as the value of distance L2 in the vertical direction of the zigzag travel. Since robot 1 will exit the work area if the last block of the zigzag travel is run at L2=200 cm, a travel of L2=100 cm is carried out corresponding to the extra amount of the work area. The work ends at location point d or e according to the input by the user.

Figure 15:
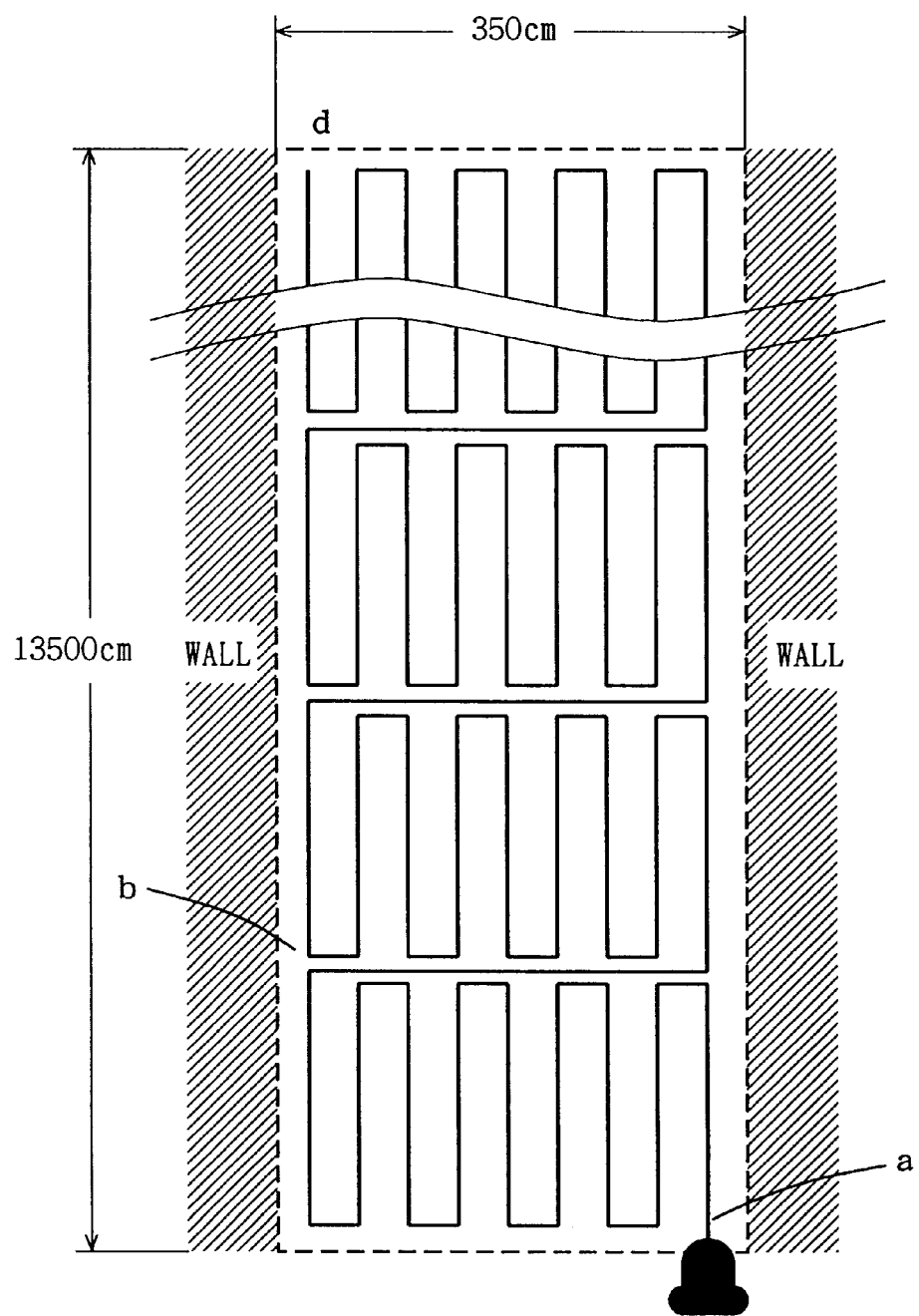
FIG. 15 is a plan view showing a travel path of robot 1 in a third environment.

FIG. 15 shows a travel path when the user enters the information of the liquid concentration of 30%, ambient temperature of 20° C., floor temperature of 20° C., humidity of 80% and no air current in the vicinity of the floor in a work area identical to that of FIG. 12.

In this case, the seventeenth environment in the table of FIG. 8 is identified, so that the wax drying time T is determined to be 6 minutes. Then, the value of 225 cm is calculated as distance L2 in the vertical direction of the zigzag travel. Therefore, the working range is divided into 60 blocks, as shown in FIG. 15. A zigzag travel is executed in each block. In this drawing, an example where the user sets the work end position of robot 1 at the side opposite to the starting side is illustrated. Therefore, robot 1 terminates its work at location point d.

According to the present embodiment, the travel path is calculated according to the environment in which robot 1 works. Therefore, a working operation of high quality can be carried out.

Although the wax drying time is obtained on the basis of a table in the present embodiment, the drying time can be calculated directly by mathematical equation from the input numerics of the environment.

Although 5 aspects of environment such as the wax concentration are stored in the table, the travel path can be calculated on the basis of at least one aspect of environment.

The present invention is also applicable to the working operation of applying paint or an adhesive agent since the finishing effect will differ according to the environment.

Furthermore, the environment can be input through a sensor or the like.

Third Embodiment

Figure 16:
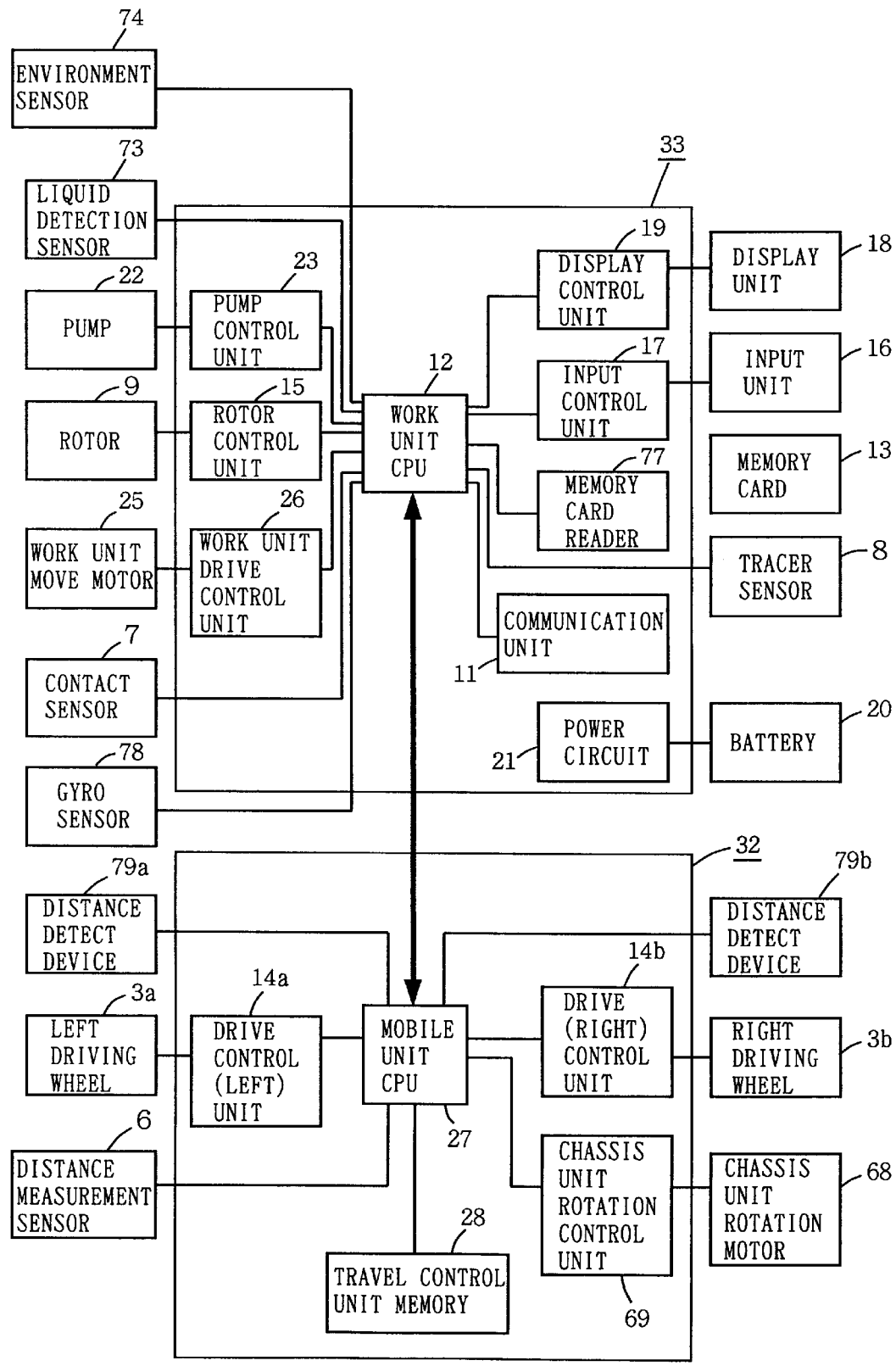
FIG. 16 is a block diagram showing a circuit structure of robot 1 according to a third embodiment of the present invention.

FIG. 16 is a block diagram showing a circuit structure of a robot according to a third embodiment of the present invention.

The robot of the third embodiment includes, in addition to the structure of the robot of the first embodiment, an environment sensor 74 for identifying the ambient environment. The value associated with the environment identified by environment sensor 74 is applied to work unit CPU 12 to be used in the calculation of the travel path.

Figure 17:
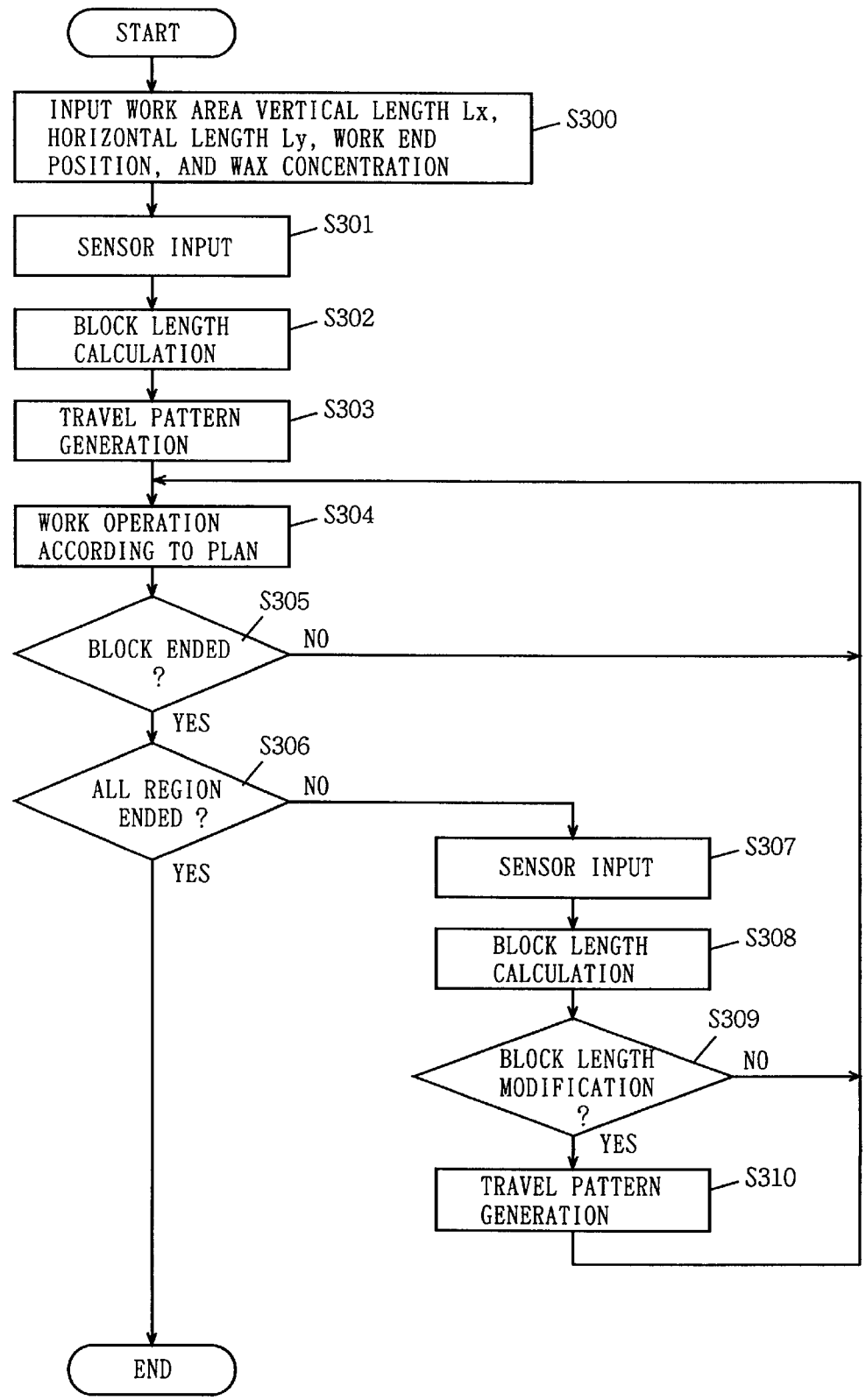
FIG. 17 is a flow chart showing a control process of robot 1 according to the third embodiment.

FIG. 17 is a flow chart showing a process carried out by robot 1 of the third embodiment.

At step S300 of FIG. 17, the user enters the distance Lx and distance Ly for the vertical direction and horizontal direction of the work area, and the ending position of the work via controller 2. The user also enters the concentration of the wax to be used.

At step S301, numerical values associated with the environment around robot 1 is input from environment sensor 74. The input numerical values include the ambient temperature, the temperature of the floor on which the wax is to be applied, the humidity, and whether there is air current in the vicinity of the floor.

At step S302, the length L2 in the vertical direction of the zigzag travel (block length) is calculated according to the input numerical values. At step S303, the travel pattern is generated according to the calculated length L2 in the vertical direction of the zigzag travel.

A working operation is executed according to the travel pattern generated at step S304.

At step S305, determination is made whether the working operation of one block is completed or not. When YES, control proceeds to step S306 to determine whether the work for all the regions has been completed. When YES, the working operation ends.

When No at step S306, control proceeds to step S307 to input numerical values from environment sensor 74 again. The length L2 in the vertical direction of the zigzag travel is calculated again according to the input values at step S308. At step S309, determination is made whether length L2 of the zigzag travel differs from the previous value. When YES, control proceeds to step S310 to generate a travel pattern again. Then, the process from steps S304 and et seq. is carried out.

When NO at step S305 or step S309, the process from steps S304 and et seq. is repeatedly executed.

Figure 18:
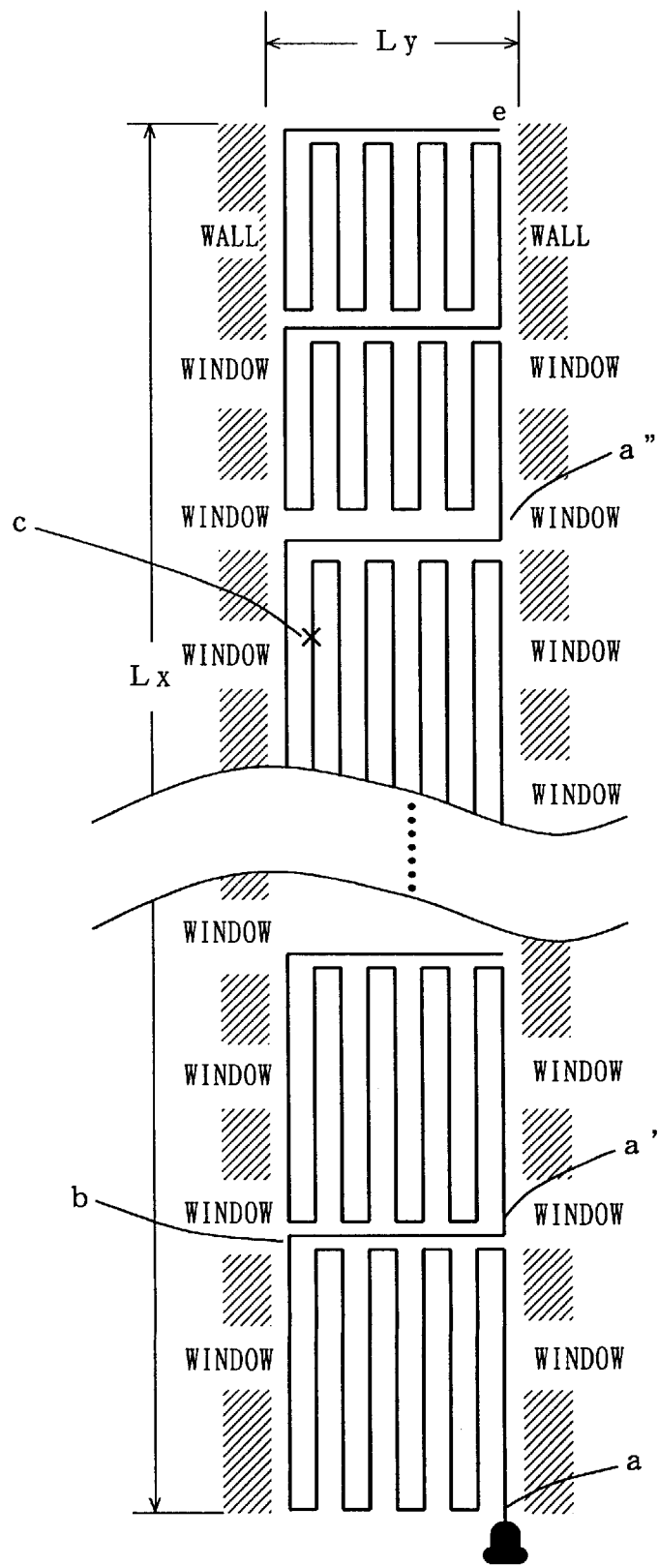
FIG. 18 is a plan view showing a travel path of robot 1 according to the third embodiment.

FIG. 18 is a plan view showing a specific example of a travel path of robot 1 of the present embodiment.

The user enters the work area vertical length Lx and the horizontal length Ly, the ending position of the work (location point e), and the wax concentration through controller 2. Here, the wax concentration is set to 20%. The work area is sandwiched by left and right walls. Windows are provided at the wall. At the work starting point (location point a), the light through the window is not directly projected on the floor.

Numerical values associated with the ambient environment are input through environment sensor 37 in robot 1. At the start of the working operation, the ambient temperature is 20° C., the floor temperature is 20° C., the humidity is 80%, and there is no air current in the proximity of the floor. Robot 1 refers to the table of FIG. 8 to calculate the wax drying time T corresponding to the environment. Length L2 of the vertical direction of the zigzag travel is calculated from time T. Let the calculation result of L2 be 400 cm.

Then, the zigzag horizontal travel pitch p and the number of reciprocations N are calculated according to length Lx of the vertical direction, length Ly of the horizontal direction, and the calculated length L2 in the vertical direction of the zigzag travel.

Then, robot 1 actually carries out the zigzag travel on the basis of the calculated horizontal travel pitch p and the like.

Robot 1 starts from location point a towards location point b. At the arrival of location point b, robot 1 turns 90° rightwards and then advances by a distance Ly, followed by a leftward rotation. Then, an advance of a short distance is carried out to arrive at location point a'.

Here, robot 1 has completed the work of one block. Therefore, numerical values corresponding to the ambient environment are measured through environment sensor 74. If there is no change in the environment, a travel is carried out in the second block identical to that of the first block to effect a similar working operation.

Consider the case where there is change in the ambient temperature, floor temperature, humidity, and the like at location point c due to the incident of light through the window after several blocks have been worked. When the ambient environment is measured by environment sensor 74 at the starting point of the next block (location point a"), the length L2 in the vertical direction of the zigzag travel is modified. As a result, a working operation corresponding to the altered environment is carried out in the subsequent blocks.

For example, when measurement is made exhibiting change in the ambient temperature to 25° C., the floor temperature to 25° C. and humidity to 70% at location point a", control is provided so that length L2 in the vertical direction of the zigzag travel is modified to, for example, 300 cm.

Consider the case when the remaining length in the vertical direction of the work area is 400 cm and the vertical length L2 in the vertical direction of the zigzag travel calculated again is 300 cm at location point a". Since the working operation of two travels of 200 cm is more efficient than the operation corresponding to length L2 divided into 300 cm and 100 cm, the travel path may be generated as L2=200 cm.

In the present embodiment, the ambient environment is automatically sensed through environment sensor 74 at every working operation of each block. A travel path most appropriate thereto is generated. Therefore, the quality of the work can be further improved.

Fourth Embodiment

The hardware structure and the like of robot 1 of a fourth embodiment of the present invention is similar to that described with reference to FIGS. 1–6. Therefore, description thereof will not be repeated.

Figure 19:
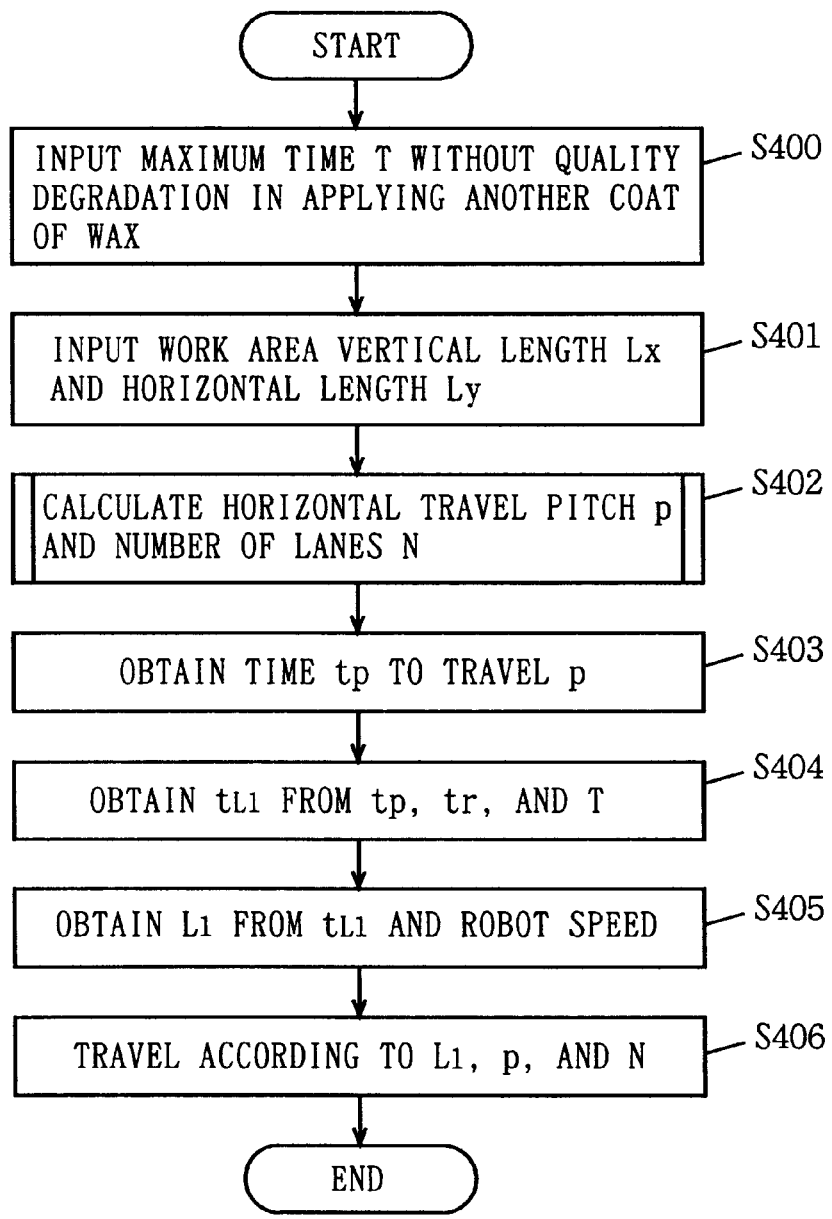
FIG. 19 is a flow chart showing a travel process of robot 1 according to a fourth embodiment of the present invention.

FIG. 19 is a flow chart showing the process of the wax apply work of robot 1 according to the fourth embodiment of the present invention.

At step S400 of FIG. 19, the maximum time T starting from application of wax to the second application of wax, which does not exhibit degradation in the work quality caused by dry up of wax is input. This value, input through controller 2, can be entered directly by the user. Alternatively, the type of wax and corresponding time T can be stored in robot 1, from which the user selects an appropriate type of wax.

At step S401, the display of FIG. 3 is provided on display unit 49. Here, the user enters vertical length Lx and horizontal length Ly of work area A. At step S402, the horizontal travel pitch p and the number of lanes N are calculated according to the work area horizontal length Ly. At step S403, the time tp for robot 1 to travel pitch p according to the advancing speed is obtained.

At step S404, the time $t_{L1}$ for robot 1 to travel length L1 in the vertical direction of the zigzag travel is obtained by the previous equation (1) according to the time tp to travel pitch p, the time tr required for robot 1 to rotate 90°, and the time T input at step S100.

At step S405, the length L1 in the vertical direction of the zigzag travel is obtained from the value of $t_{L1}$ and the speed of robot 1.

At step S406, the travel of robot 1 is carried out as shown in FIG. 6 according to variables L1, p and N.

The process of calculating the horizontal travel pitch p and the number of lanes N at step S402 of FIG. 7 is as described with reference to FIG. 9.

By the above control, the problem of the wax being half-dried or completely dried during the travel of robot 1 from location point c1 to location pint d1 shown in FIG. 6 is eliminated. Thus, the problem of unevenness in the wax applied face or glossiness of the floor after waxing being lost is prevented.

Fifth Embodiment

A plan view showing a travel path of robot 1 according to a fifth embodiment of the present invention is similar to that of FIG. 11. The hardware structure of robot 1 of the fifth embodiment is similar to that of the first embodiment. Therefore, description thereof will not be repeated.

The straight forward distance L2 of the zigzag travel in the fifth embodiment is at least two times the distance L1 of the fourth embodiment. A specific operation of robot 1 will be described hereinafter.

Figure 20:
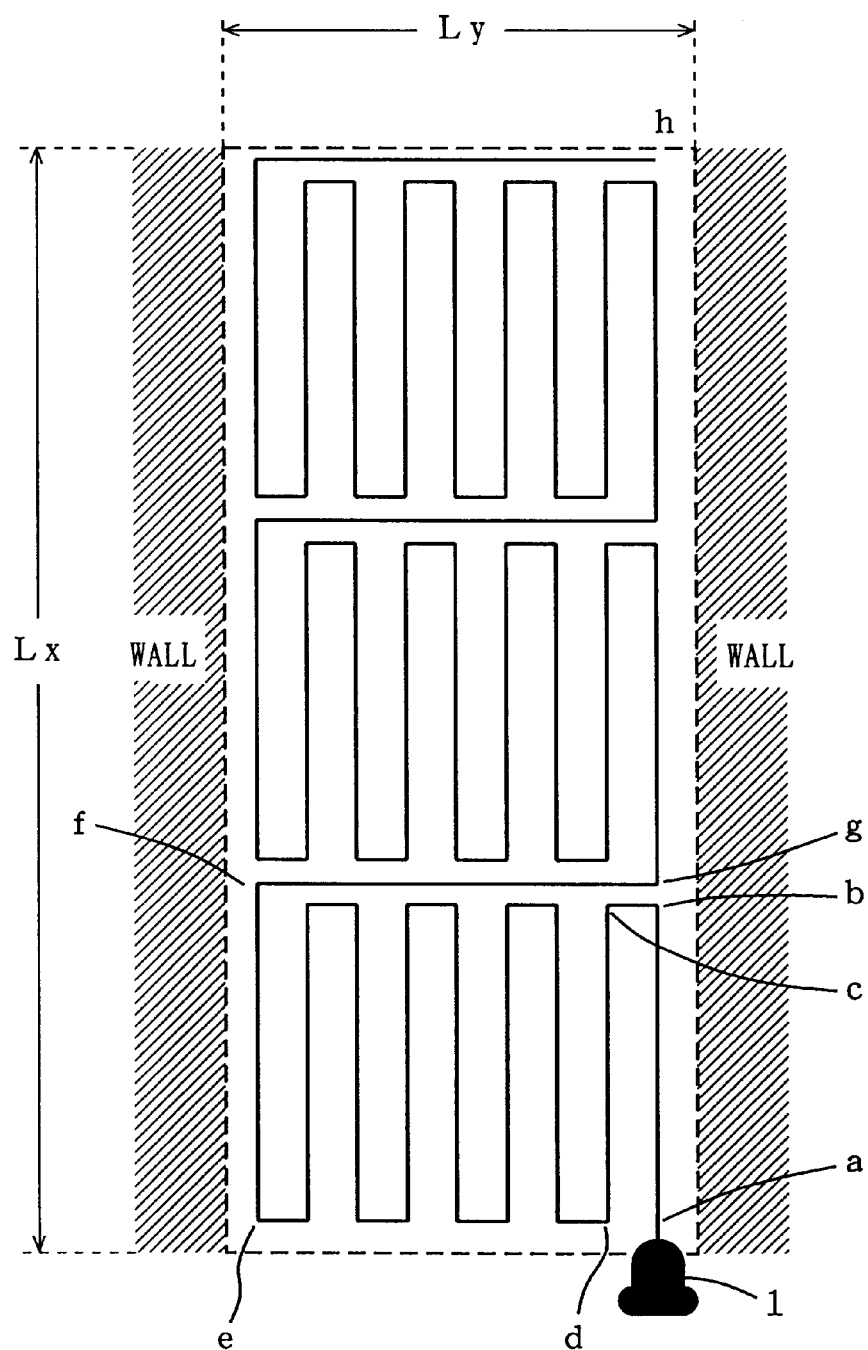
FIG. 20 is a plan view for describing a work of robot 1 according to a fifth embodiment of the present invention.
Figure 21:
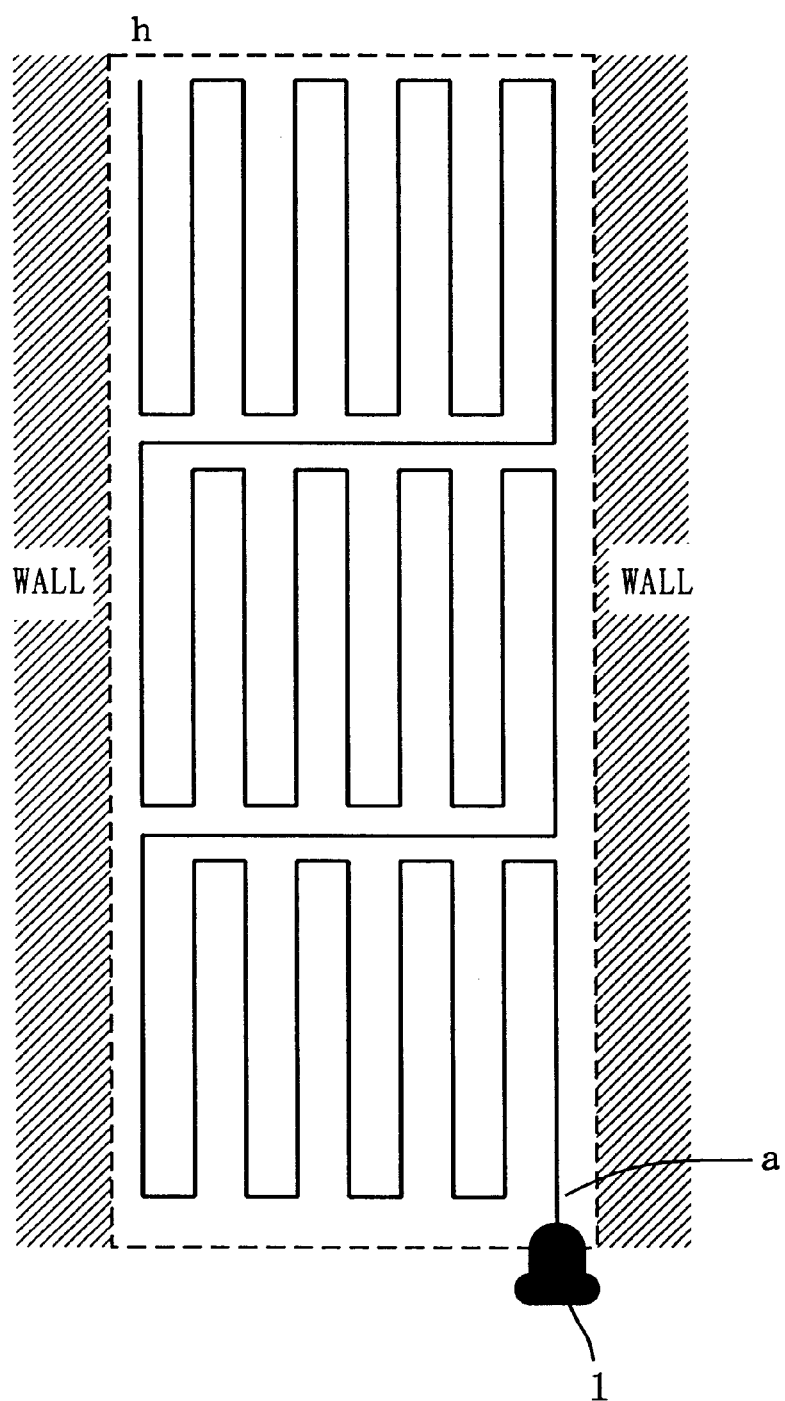
FIG. 21 shows a modification of the travel path of the fifth embodiment.

Referring to FIG. 20, robot 1 is used to carry out a work on a region sandwiched by left and right walls. The input of the information of the vertical length Lx and horizontal length Ly of the work region is transmitted to robot 1. As described before, robot 1 calculates the zigzag travel pitch p, the length L2 in the vertical direction of the zigzag travel, and the number of lanes N according to various variables to determine the travel path. Robot 1 has its movement limited by the travel path.

In the straight forward movement from starting point a, a travel relative to the right side wall is effected using right tracer sensors 8c and 8d. Upon arrival at location point b, robot 1 temporarily stops. In order to proceed the work leftwards, a leftward rotation, advance of pitch p, and a leftward rotation are carried out to make a U-turn. Upon completion of the U-turn, robot 1 runs straight along the second lane from location point c to location point d. In the second lane, robot 1 travels maintaining a constant distance with respect to the left and right walls using distance measurement sensor 6. Upon arrival at location point d, robot 1 makes a U-turn rightwards. By repeating this reciprocating operation, the zigzag travel is carried out. In the last lane of the zigzag travel from location point e to location point f, the left tracer sensors 8a and 8b are used.

At location point f, robot 1 turns 90° rightwards. This 90° rotation must be carried out following the shift of robot 1 away from the wall since there is a wall at the left side. For this purpose, this 90° rotation is carried out by the steps shown in FIGS. 13A–13E.

Referring to FIG. 20 again, robot 1 advances straight forward from location point f to location point g. At location point g, robot 1 turns 90° leftwards, and then slightly advances to move to the starting position of the next block of zigzag travel. Then, by repeating a similar zigzag travel, the working operation is terminated at location point h.

Although the work ending position (location point h) is at the side of the work starting side of robot 1 in FIG. 20, the work ending position (location point h) can be set opposite to the side of the starting side of robot 1. Also, the work ending position can be arbitrarily set by the user at a side identical to or differing from the side of the starting position.

Although the present invention has been described and illustrated in detail, it is clearly understood that the same is by way of illustration and example only and is not to be taken by way of limitation, the spirit and scope of the present invention being limited only by the terms of the appended claims.

What is claimed is:

1. A mobile control apparatus for controlling a mobile that carries out a work on a first region, and then a work on a second region having an area common to said first region, said mobile control apparatus comprising:

first set means for setting a time between said mobile carrying out a work on the common area of said first and second regions and said mobile carrying out the next work on that area, and second set means for setting a travel path of said mobile according to the time set by said first set means.

2. The mobile control apparatus according to claim 1, wherein said first set means sets a numerical value input through an input unit as the time.

3. The mobile control apparatus according to claim 1, further comprising:

an input unit for entering information associated with a factor affecting the work carried out by said mobile, wherein said first set means sets the time according to the information input through said input unit.

4. The mobile control apparatus according to claim 3, wherein said second set means sets the travel path of said mobile so that a time interval of the work on the common area of said first and second regions is shorter than the time set by said first set means.

5. The mobile control apparatus according to claim 1, further comprising:

a detection unit for detecting information associated with a factor that affects the work carried out by said mobile, wherein said first set means sets the time according to the information detected by said detection unit.

6. The mobile control apparatus according to claim 5, wherein said second set means sets the travel path of said mobile so that a time interval of the work on the common area of said first and second regions is shorter than the time set by said first set means.

7. The mobile control apparatus according to claim 5, further comprising:

an input unit for entering information associated with a factor affecting the work carried out by said mobile, wherein said first set means sets the time according to the information detected by said detection unit and the information input through said input unit.

8. The mobile control apparatus according to claim 5, further comprising:

third set means to detect information by said detection unit during travel of said mobile to reset a time interval of the work on the common area of said first and second regions and the travel path of said mobile.

9. A mobile work apparatus for carrying out a work on a first region and then a work on a second region having an area common to said first region, said mobile work apparatus comprising:

a body carrying out a predetermined work while moving, first set means for setting a time between said body carrying out a work on the common area of said first and second regions and said body carrying out the next work on that area, and second set means for setting a travel path of said mobile work apparatus according to the time set by said first set means.

10. The mobile work apparatus according to claim 9, wherein said second set means sets the travel path of said mobile work apparatus so that a time interval of the work on the common area of said first and second regions is shorter than the time set by said first set means.

11. The mobile work apparatus according to claim 10, wherein said first set means sets a numerical value input through an input unit as the time.

12. The mobile work apparatus according to claim 10, further comprising:

an input unit for entering information associated with a factor affecting the work carried out by said mobile work apparatus, wherein said first set means sets the time according to the information input through said input unit.

13. The mobile work apparatus according to claim 10, further comprising:

a detection unit for detecting information associated with a factor that affects the work carried out by said mobile work apparatus, wherein said first set means sets the time according to the information detected by said detection unit.

14. The mobile work apparatus according to claim 10, wherein said body repeats straight forward advance and 90° rotation to move in a work area.

* * * * *